United States Patent [19]
Aizawa et al.

[11] Patent Number: 5,639,165
[45] Date of Patent: Jun. 17, 1997

[54] METHOD OF OPERATING PUMP AND BEARING DEVICE FOR PUMP

[75] Inventors: Kohji Aizawa, Hitachi; Akira Yamaguchi, Chiyoda-machi; Shigenobu Nagasawa, Minori-machi; Shiro Matsui, Chiyoda-machi; Kunio Takada, Iwama-machi; Yoshiaki Chiba, Hitachi, all of Japan

[73] Assignee: Hitachi, Ltd., Tokyo, Japan

[21] Appl. No.: 502,978

[22] Filed: Jul. 17, 1995

[30] Foreign Application Priority Data

Aug. 4, 1994 [JP] Japan .................... 6-183203

[51] Int. Cl.$^6$ ............ F04B 53/00; F16C 3/02; F16C 17/04
[52] U.S. Cl. .................... 384/315; 417/53
[58] Field of Search ............ 384/315, 322, 384/400, 415; 417/53, 423.13

[56] References Cited

U.S. PATENT DOCUMENTS

| | | | |
|---|---|---|---|
| 2,008,527 | 7/1935 | Warren | 384/315 |
| 3,104,921 | 9/1963 | Newcomer | 384/400 X |
| 3,513,942 | 5/1970 | Sato | 417/423.13 |

FOREIGN PATENT DOCUMENTS

| | | |
|---|---|---|
| 55-90718A | 7/1980 | Japan . |
| 59-155621A | 9/1984 | Japan . |
| 2115592A | 4/1990 | Japan . |
| 436120 | 3/1992 | Japan . |
| 264704 | 1/1950 | Switzerland ............ 417/423.13 |

Primary Examiner—William P. Neuder
Attorney, Agent, or Firm—Kenyon & Kenyon

[57] ABSTRACT

In a ceramic bearing device having a ceramic bearing slidably supporting a sleeve fixed to a pump main shaft, a bearing case mounting the ceramic bearing and a bearing casing elastically supporting the bearing case with rubber, a cylindrical container is fixed to the bearing casing so as to surround the lower surface and the outer peripheral side of the bearing casing, a water storage tank having a return plate in the top end portion being fixed to the pump main shaft so as to surround the cylindrical container, a passage being provided in the cylindrical container, distance pieces being provided between the outer peripheral portion of the bearing casing and the inner peripheral portion of the cylindrical container being provided, a passage being formed in the distance piece.

23 Claims, 12 Drawing Sheets

DISTANCE FROM THE CENTER
OF ROTATING SHAFT

X: OUTER SURFACE OF OUTER CYLINDER IN CYLINDRICAL CONTAINER
V: INNER SURFACE OF INNER CYLINDER IN CYLINDRICAL CONTAINER
W: INNER SURFACE OF OUTER CYLINDER IN CYLINDRICAL CONTAINER
Y: INNER SURFACE OF CYLINDER IN WATER STRAGE TANK

5,639,165

METHOD OF OPERATING PUMP AND BEARING DEVICE FOR PUMP

BACKGROUND OF THE INVENTION

1. Field of the Invention

The present invention relates to an operating method for a pump and a bearing device for a pump, and more particularly relates to a method of operating a vertical shaft pump used for drainage of rain water and a bearing device for the pump.

2. Description of the Related Art

A conventional technology in relation to a method of operating a pump and a bearing device for a pump according to the present invention will be described below with taking a ceramic bearing device for a vertical shaft pump used for drainage of rain water, referring to FIG. 13. FIG. 13 is a vertical cross-sectional view showing a conventional ceramic bearing device for a vertical shaft pump used for drainage of rain water. The reference character 1 indicates a pump main shaft, the reference character 3 indicates a ceramic bearing device, the reference character 9 indicates a casing flange portion, the reference character 10 indicates a pump casing and the reference character 32 indicates an impeller. In this example, three of the ceramic bearing devices 3 are mounted and fixed to the casing flange 9 or the pump casing 10. The impeller 32 rotates together with the pump main shaft 1, and the impeller 32 pumps the pumped water to flow up inside the pump casing 10.

The ceramic bearing is widely used for a bearing in a vertical shaft pump since it is generally superior in wear resistance and can use the pumped water as its lubricant.

In recent years, the amount of rain water flowing into a drainage pump station in a city is rapidly increasing because of rapid urbanization. In order to cope with this situation, there is a growing need for precursory standby operation of the drainage pump.

However, in the vertical shaft pump used for drainage of rain water often in such a precursory standby operation, the pump main shaft is rotated for a long period with on-load operation in which the water is not pumped. In such a case, since lubricating water is not injected into the bearing, occurrence of an abnormal wear in the bearing due to dry sliding cannot be avoided. That is, even if a ceramic bearing is employed, the occurrence of an abnormal wear in the bearing cannot be avoided.

A method solving such a problem is disclosed in Japanese Patent Application Laid-Open No. 2-115592 (1990), where lubricating water from a water source external to the drainage pump is injected into the bearing. In this method, by judging whether the bearing is immersed or not using a priming detector, the lubricating water is injected if the bearing is not immersed. And the lubricating water is stopped to be injected if the bearing is immersed.

A method coping with no-load operation for a short period using an oil retaining porous ceramic bearing is disclosed in Japanese Patent Application Laid-Open No. 59-155621 (1984) where the bearing sliding surface is lubricated with a small amount of oil exuded from the porous ceramic bearing with thermal expansion of the oil.

A method is also disclosed in Japanese Patent Application Laid-Open No. 55-90718 (1980) where no-load operation is performed by using clean water supplied from an external pump and stored in the inner peripheral portion of a protecting tube.

Further, a method is disclosed in Japanese Utility Model Application Laid-Open No. 4-36120 (1992) where a water tank is fixed to the pump main shaft and no-load operation is performed by lubricating the bearing using the water stored in the water tank.

However, in the lubricating construction of the ceramic bearing disclosed in Japanese Patent Application Laid-Open No. 2-115592 (1990), there is disadvantage in that a large amount of lubricating water is required when the no-load operation of the pump is performed for a long period since the water injected into the bearing is supplied from the external water source during the no-load operation. Further, since there is a water supplying piping system, the maintenance management for the piping system is required and, therefore, the labor for the maintenance will be increased.

In the oil retaining porous ceramic bearing disclosed in Japanese Patent Application Laid-Open No. 59-155621 (1984), lubrication is not sufficient and the temperature of the bearing increases since the amount of oil is small. Further, a shortage of oil will occurs since the small amount of the exuded oil does not return to the bearing. Therefore, it is impossible to repeat the on-load operation.

In the method where no-load operation is performed by using clean water supplied from an external pump and stored in the inner peripheral portion of a protecting tube as disclosed in Japanese Patent Application Laid-Open No. 55-90718 (1980), since there is a water supplying piping system, the maintenance management for the piping system is required and, therefore, the labor for the maintenance will be increased. This is similar to the case of Japanese Patent Application Laid-Open No. 2-115592 (1990).

In the lubricating method disclosed in Japanese Utility Model Application Laid-Open No. 4-36120 (1992), it is thought that when the pump starts to rotate, the water inside the water tank is moved toward the outer peripheral portion and splashed with the action of centrifugal force. Therefore, it is predicted that no-load operation for a long period will cause the shortage of the water inside the water tank to lose a stable lubrication characteristic of the bearing.

In other words, in the case of the lubricating construction of bearing, it is impossible to repeat the no-load operation for a long period without supply of lubricating water from the water source external to the pump.

SUMMARY OF THE INVENTION

The present invention is made with taking the above status into consideration. The object of the present invention is to provide a bearing device for a pump capable of repeating the no-load operation longer than 30 minutes without supplying water from a water source external to the pump.

The object of the present invention can be attained by doing as follows.

(1) In a method of operating a pump having a bearing device which has a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, the water storage tank being fixed to the pump main shaft, means for preventing the pumped water from splashing outside the water storage tank, no-load operation of the pump being performed for longer than 30 minutes without supplying water from a water source outside the pump casing.

(2) In a method of operating a pump having a bearing device which has a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, a return plate being attached to the upper end portion of the water storage tank, a cylindrical container being provided inside the water tank, the cylindrical container being open in the upper portion, having a passage communicating between the inside portion and the outside portion and having a water flow changing plate in the inside portion so as to cover the passage, the cylindrical container being composed of an inner cylinder and an outer cylinder, and a horizontal bottom plate the end portions of which are secured to the both bottom end portions of the inner cylinder and the outer cylinder, the inner cylinder being positioned in the outer peripheral side of the pump main shaft, the horizontal bottom plate being positioned in the lower side of the bottom surface of the bearing casing, the outer cylinder being positioned in the outer peripheral side of the bearing casing, the cylindrical container being fixed to the bearing casing so as to surround the bottom surface and the outer peripheral side the bearing casing, the water storage tank being fixed to the pump main shaft so as to surround the cylindrical container, no-load operation of the pump being performed for longer than 30 minutes without supplying water from a water source outside the pump casing.

(3) In a bearing device for a pump having a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, the water storage tank being fixed to the pump main shaft, means for preventing the pumped water from splashing outside the water storage tank.

(4) In a bearing device for a pump having a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, the water storage tank being fixed to the pump main shaft, a return plate being attached to the upper end portion of the water storage tank.

(5) In a bearing device for a pump having a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, a return plate being attached to the upper end portion of the water storage tank, a small cylindrical container opening the upper portion placed inside the water storage tank being fixed to the outer peripheral portion of the bearing casing, a passage communicating between the small cylindrical container and the bearing sliding surface or a gap formed above the bearing sliding surface being provided, the water storage tank being fixed to the pump main shaft so as to surround the small cylindrical container.

(6) In a bearing device for a pump having a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, a return plate being attached to the upper end portion of the water storage tank, a cylindrical container opening in the upper portion and having a passage communicating between the inside portion and the outside portion being provided inside the water tank, the cylindrical container being composed of an inner cylinder and an outer cylinder, and a horizontal bottom plate the end portions of which are secured to the both bottom end portions of the inner cylinder and the outer cylinder, the inner cylinder being positioned in the outer peripheral side of the pump main shaft, the horizontal bottom plate being positioned in the lower side of the bottom surface of the bearing casing, the outer cylinder being positioned in the outer peripheral side of the bearing casing, the cylindrical container being fixed to the bearing casing so as to surround the bottom surface and the outer peripheral side the bearing casing, the water storage tank being fixed to the pump main shaft so as to surround the cylindrical container.

(7) In a bearing device for a pump having a bearing slidably supporting a pump main shaft provided inside a pump casing, a bearing case mounting the bearing and a bearing casing elastically supporting the bearing case, a water storage tank for storing pumped water is provided so as to surround the outer periphery of the bearing casing, a return plate being attached to the upper end portion of the water storage tank, a cylindrical container being provided inside the water tank, the cylindrical container being open in the upper portion, having a passage communicating between the inside portion and the outside portion and having a water flow changing plate in the inside portion in covering the passage, the cylindrical container being composed of an inner cylinder and an outer cylinder, and a horizontal bottom plate the end portions of which are secured to the both bottom end portions of the inner cylinder and the outer cylinder, the inner cylinder being positioned in the outer peripheral side of the pump main shaft, the horizontal bottom plate being positioned in the lower side of the bottom surface of the bearing casing, the outer cylinder being positioned in the outer peripheral side of the bearing casing, the cylindrical container being fixed to the bearing casing so as to surround the bottom surface and the outer peripheral side the bearing casing, the water storage tank being fixed to the pump main shaft so as to surround the cylindrical container.

(8) In a bearing device for a pump described in the above item (5), the passage provided in the small cylindrical container is composed of a plurality of holes directing in the radial direction arranged on an identical circumference in a given spacing.

(9) In a bearing device for a pump described in the above item (6) or (7), the passage provided in the cylindrical container is composed of a plurality of holes directing in the radial direction arranged on an identical circumference in a given spacing.

(10) In a bearing device for a pump described above item (5), the return plate attached to the upper end portion of the water storage tank is constructed so as to surround the upper end portion in the outer peripheral side of the small cylindrical container to prevent the pumped water inside the water storage tank from splashing outside the small cylindrical container.

(11) In a bearing device for a pump described in the above item (6) or (7), the return plate attached to the upper end portion of the water storage tank is constructed so as to surround the upper end portion in the outer peripheral side of the cylindrical container to prevent the pumped water inside the water storage tank from splashing outside the cylindrical container.

(12) In a bearing device for a pump described in the above item (7), the water flow changing plate is attached to the outer peripheral side of inner portion of the cylindrical container so as to cover the passage communicating the inner portion and the outer portion of the cylindrical container.

(13) In a bearing device for a pump described in the above item (7) or (12), the water flow changing plate has a plurality of holes in the direction perpendicular to the direction of the passage provided in the cylindrical container.

(14) In a bearing device for a pump described in the above item (4), (5), (6) or (7), the return plate is composed of a cylindrical inner plate and a cylindrical outer plate and a horizontal top plate the end portions of which are secured to the both top end portions of the inner plate and the outer plate, the angle between the inner plate and the horizontal top plate being smaller than 90 degree.

(15) In a bearing device for a pump described in the above item (4), (5), (6) or (7), sealing capability for preventing foreign objects from entering is added to the upper surface of the return plate.

(16) In a bearing device for a pump described in the above item (5), (6) or (7), a plurality of holes communicating between the cylindrical container and a plenum provided in the upper portion of the bearing are provided.

(17) A bearing device for a pump described in the above item (4), (5), (6) or (7) which comprises means for confirming presence or absence of the pumped water.

(18) In a bearing device for a pump described in the above item (17), the means for confirming presence or absence of the pumped water employs a capacitance type water level gauge.

(19) In a bearing device for a pump described in the above item (17), the means for confirming presence or absence of the pumped water employs an optical type water level gauge or an electric type water level gauge.

(20) In a bearing device for a pump described in the above item (17), the means for confirming presence or absence of the pumped water employs a pressure type water level gauge.

(21) A bearing device for a pump described in the above item (5) which comprises a water supply and drainage means for discharging particles of soil and sand inside the small cylindrical container.

(22) A bearing device for a pump described in the above item (6) or (7) which comprises a water supply and drainage means for discharging particles of soil and sand inside the cylindrical container.

(23) In a bearing device described in any one of the above items (3) to (22), the bearing is a ceramic bearing.

(24) A drainage pump mounting a bearing device any one of the above items (3) to (23).

In the bearing device for a pump according to the present invention, since pumped water stored in a water storage tank in advance is supplied and recirculated to the sliding surface of the bearing, the bearing is always in a lubricated state and a stable lubrication characteristic can be attained without supplying any water from a water source outside the pump.

In the case of the present invention, since there is provided a means for preventing the pumped water inside the water storage tank from splashing, the pumped water inside the water storage tank is not splashed outside. Further, the pumped water is automatically supplied and stored in the water storage tank, for example, during pumping operation of the drainage pump. And the pumped water once stored in the water storage tank does not vaporize to run out since the humidity inside the drainage pump is high.

Therefore, it is possible to repeat no-load operation of the pump for above 30 minutes without any water supply from a water source external to the pump, and further there is no need to supply water from the external.

Since the pumped water inside the water storage tank is not splashed outside when the water storage tank is rotated, there is no large difference in the water level of the pumped water between when the water storage tank is rotated and stopped. Consequently, it is possible to obtain a bearing device for a pump having a high reliability.

Further, since a ceramic having a dense structure comparing to the oil retaining porous ceramic can be used as the bearing material, the reliability in mechanical strength is improved.

Furthermore, since the water supply piping system is not required, the time and labor for the maintenance management of the piping system can be eliminated. And since there is no failure of the water supply piping system, the reliability of the whole pump system can be improved.

DETAILED DESCRIPTION OF THE PREFERRED EMBODIMENTS

Embodiment of the present invention will be described in detail below, referring to the accompanying drawings. The bearing device for a pump according to the present invention is a bearing device for a pump having a ceramic bearing (hereinafter referred to as "ceramic bearing device") and is mounted in a drainage pump. That is, although ceramic is used as the bearing material for the bearing device for the pump in the embodiments according to the present invention, the bearing material is not limited only to ceramics.

Figure 1:
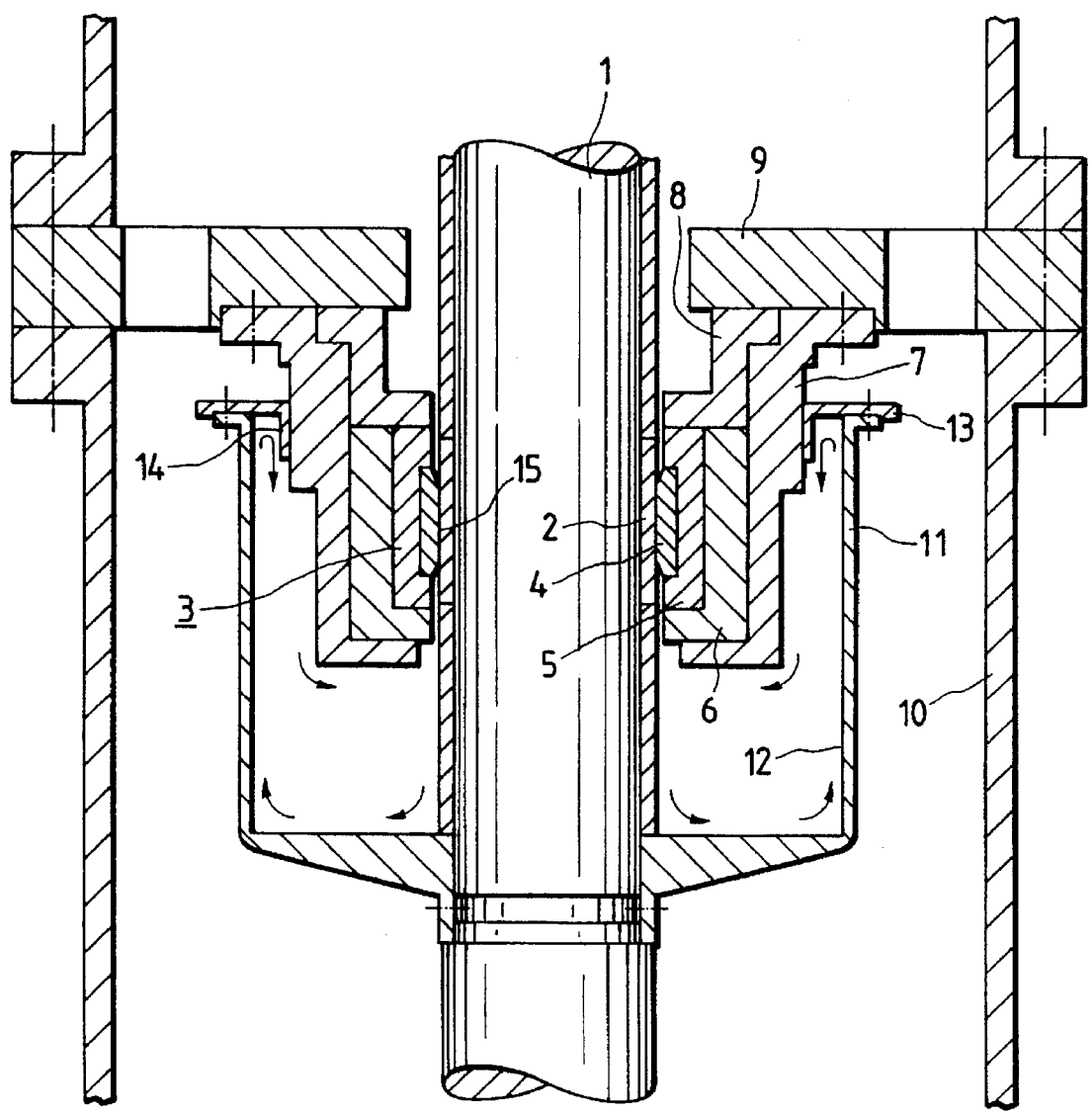
FIG. 1 is a vertical cross-sectional view showing a first embodiment of a ceramic bearing device in accordance with the present invention.

A first embodiment according to the present invention will be described below, referring to FIG. 1. FIG. 1 is a vertical cross-sectional view showing the first embodiment of a ceramic bearing device in accordance with the present invention.

A ceramic bearing device 1 is a supporting device for a pump main shaft 1 fixing a sleeve 2 made of a sintered hard alloy or coated with a sintered hard alloy on the outer peripheral portion, and having a ceramic bearing 4 slidably supporting the sleeve 2, a bearing case 5 mounting the ceramic bearing 4, a bearing casing 7 elastically supporting the bearing case 5 with rubber member 6 and a bearing positioning member 8. A water storage tank 11 for storing pumped water is fixed to the pump main shaft 1 so as to surround the outer peripheral side of the bearing casing 7.

A pump casing flange 9 is fixed to a pump casing 10, the bearing casing 7 is attached to the casing flange 9, a return plate 13 for preventing pumped water stored inside the water storage tank 11 from splashing is attached to the upper portion of the water storage tank 11. The arrows shown inside the water storage tank 11 indicate the recirculating directions of the pumped water during rotating of the drainage pump.

The water storage tank 11 is supplied with the lubricating water after completion of the assembling in advance. After then, however, pumped water is automatically supplied to the water storage tank during operating the drainage pump and accordingly the water storage tank is always filled with the pumped water as the lubricating water. In a case where the pumped water is stored in the water storage tank 11, the pumped water is moved toward the outer peripheral side of the water storage tank 11 by the centrifugal force and raised up along a wall surface 12 when the pump main shaft 1 is rotated. The pumped water raised is returned back down ward along a return inner plate 14 from a return plate 13.

As described above, since the pumped water is only recirculated as shown by the arrows, but not splashed out of the water storage tank 11, the amount of the pumped water is not decreased. That is, a bearing sliding surface 15 is always in a lubricated state, and a stable sliding characteristic can be attained during no-load operation over 30 minutes without pumping water. Since the ceramic bearing 4 is immersed into the pumped water during stopping to be rotated, a stable sliding characteristic can be attained just after starting to be rotated.

With the construction of the bearing device described above, there is no need to supply the lubricating water from a water source external to the drainage pump. That is, since the water supply piping is not required, the maintenance management of the water supply piping is eliminated and the incapability of starting the pump due to a failure of the water supply system is eliminated. Therefore, the reliability of the pump system is improved. Further, since the pumped water is recirculated to increase heat removal, temperature rise of the water is suppressed to improve the load resistance of the bearing.

Figure 2:
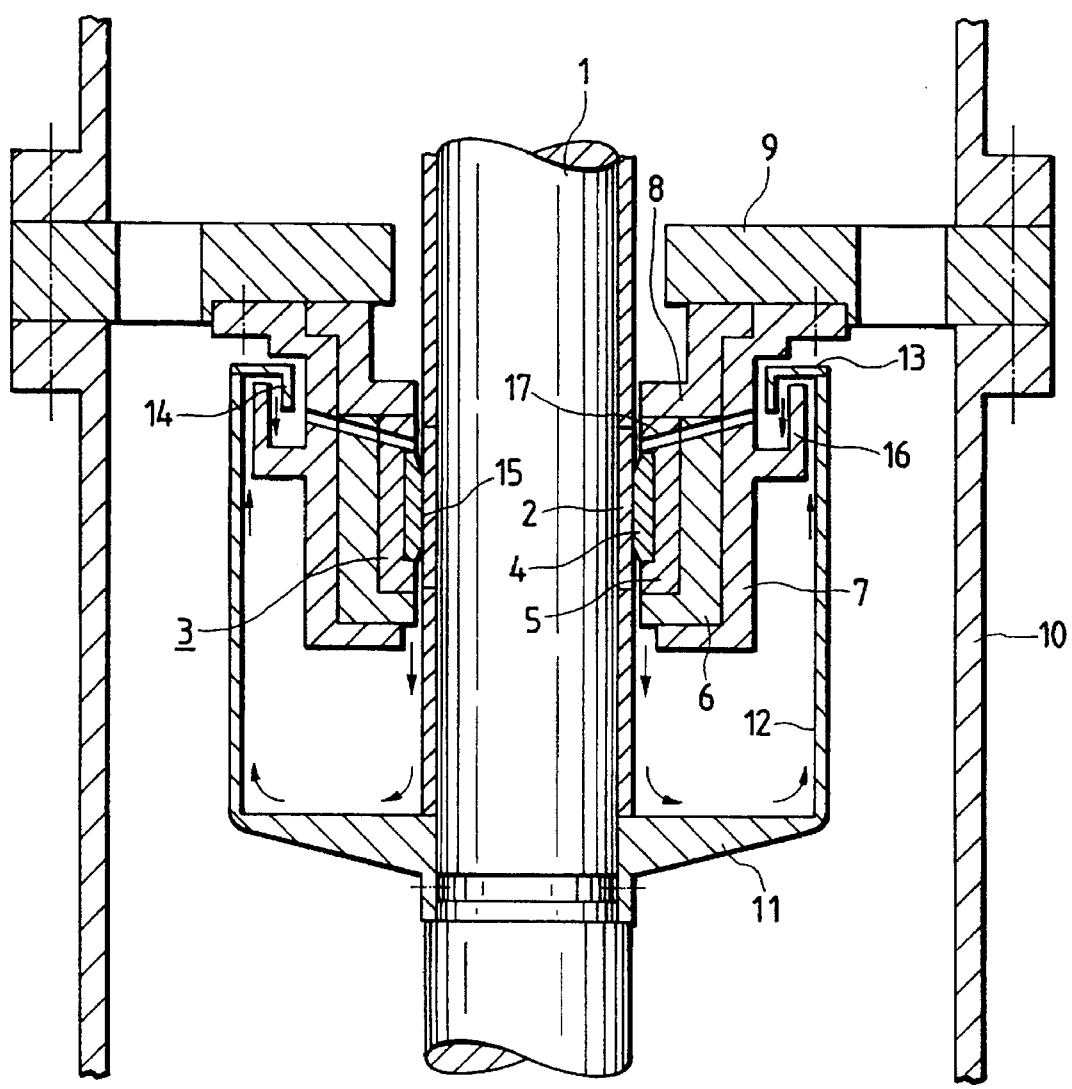
FIG. 2 is a vertical cross-sectional view showing a second embodiment of a ceramic bearing device in accordance with the present invention.

A second embodiment according to the present invention will be described below, referring to FIG. 2. FIG. 2 is a cross-sectional view showing the second embodiment according to the present invention.

The bearing device in this embodiment has nearly the same construction as that in the embodiment described above. The bearing device in this embodiment has the following character. That is, a small cylindrical container 16 opening the upper portion is fixed to the outer peripheral portion of the bearing casing 7, a passage 17 communicating between the small cylindrical container 16 and a gap formed in the upper side of the bearing sliding surface 15 is provided, and the water storage tank 11 having a return plate 13 in the top end portion is fixed to the pump main shaft 1 so as to surround the small cylindrical container 16.

Therefore, when the pump main shaft 1 is rotated in this embodiment, the pumped water is moved toward the outer peripheral side of the water storage tank 11 by centrifugal force and raised upward along the wall surface 12. However, the pumped water raised is flows into the small cylindrical container 16 by the action of the return plate 13. Then, the pumped water reaches to the gap portion 15 above the bearing sliding surface 15 through the passage 17.

As described above, since the pumped water is supplied and recirculated to the bearing sliding surface 15, the bearing sliding surface is always in a lubricated state and, accordingly, a stable sliding characteristic can be attained. Further, since the pumped water is only recirculated as shown by the arrows, but not splashed out of the water storage tank 11, the amount of the pumped water is not decreased. And the pumped water once stored in the water storage tank does not vaporize and stored inside the water storage tank for long time since the humidity inside the drainage pump is high.

In this embodiment, the passages 17 are provided in two positions. However, since the proper number of the passages 17 is determined by the amount of recirculating pumped water, the number and the shape of the passages are not specially limited. However, from the reliability point of view, it is better to provide a plural number of the passages.

As described above, since the ceramic bearing 4 is always in a lubricated state, a stable sliding characteristic can be attained during no-load operation over 30 minutes without pumping water.

Figure 3:
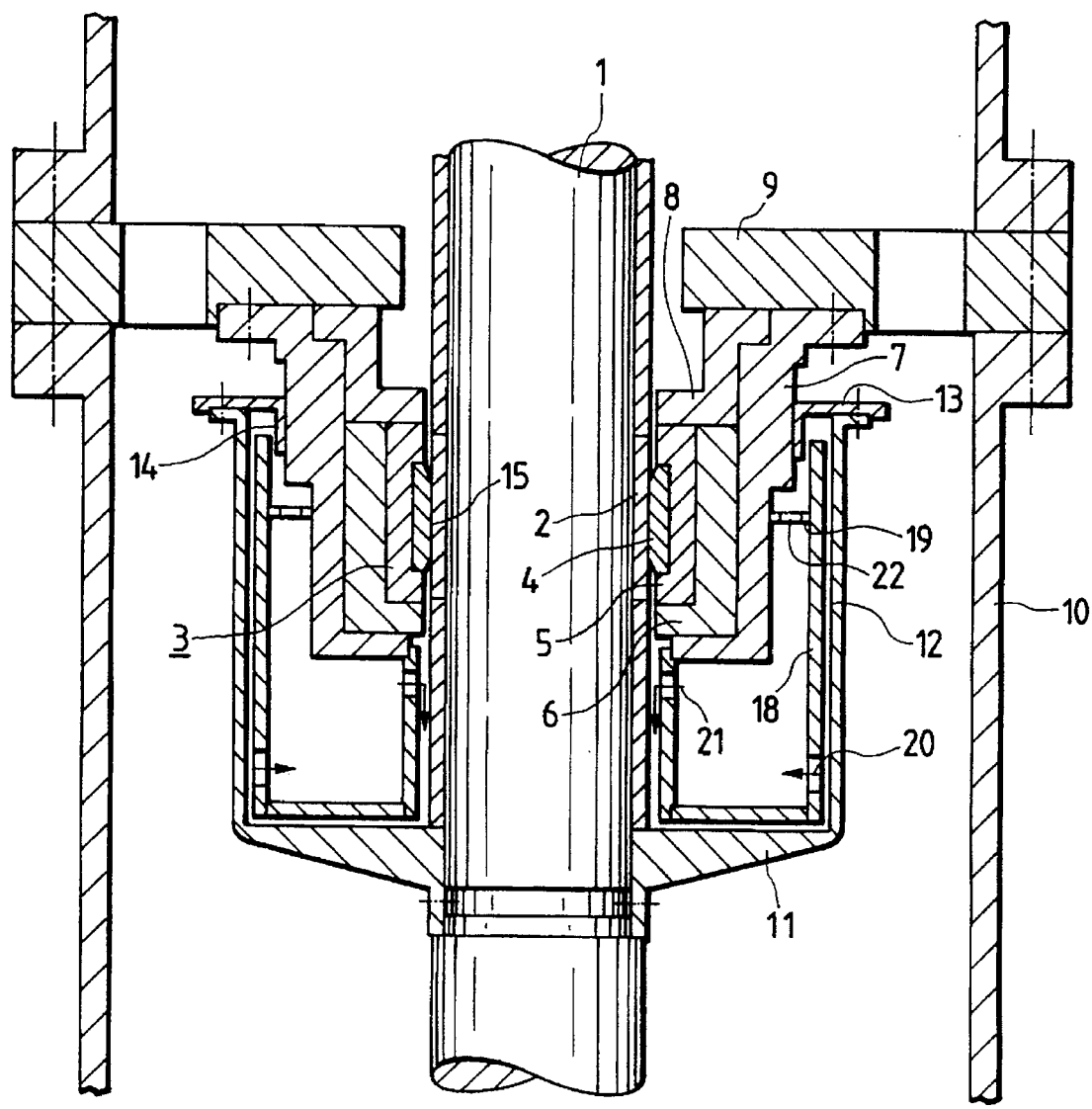
FIG. 3 is a vertical cross-sectional view showing a third embodiment of a ceramic bearing device in accordance with the present invention.

A third embodiment according to the present invention will be described below, referring to FIG. 3. FIG. 3 is a cross-sectional view showing the third embodiment according to the present invention.

In this embodiment, the cylindrical container 18 is composed of an inner cylinder and an outer cylinder, and a horizontal bottom plate the end portions of which are secured to the both bottom end portions of the inner cylinder and the outer cylinder. The inner cylinder is positioned in the outer peripheral side of the pump main shaft 1, the horizontal bottom plate is positioned in the lower side of the bottom surface of the bearing casing 7, the outer cylinder is positioned in the outer peripheral side of the bearing casing 7, and the cylindrical container is fixed to the bearing casing 7 so as to surround the bottom surface and the outer peripheral side the bearing casing 7. Further, the water storage tank 11 having the return plate 13 in the top end portion is fixed to the pump main shaft 1 so as to surround the cylindrical container 18.

Passages 20 and 21 are provided in the cylindrical container 18, and the passages 20 and 21 are composed of a plurality of holes bored in the radial direction on an identical circumference in spacing a given distance. Since the purpose of the passages 20 and 21 is to recirculate the pumped water, the position of them is not specially limited and there are some cases where a plurality of holes bored in the axial direction are used.

Further, distance pieces 19 are provided between the outer peripheral portion of the bearing casing 7 and the cylindrical container 18, and passages 22 are formed in the distance pieces 19.

When the water storage tank 11 is rotated, rotating force acts on the pumped water contacting to the bottom portion of the water storage tank 11 due to the viscosity of the pumped water, and the pumped water in the gap between the water storage tank 11 and the cylindrical container 18 is moved toward the outer direction. However, a part of the pumped water returns into the cylindrical container 18 through the passage 20 and the remainder of the pumped water is splashed back with the return plate 13 attached on the upper portion of the water storage tank 11 to flow into and recirculate inside the cylindrical container 18.

Supply of water for the pumped water shifted toward the outer peripheral side of the cylindrical container due to centrifugal force is performed by allowing the pumped water to continuously flow into the gap described above through the passage 21 provided in the inner cylinder. That is, since the pumped water inside the cylindrical container 18 simply recirculates in a steady state, the static pressure of the pumped water is kept nearly constant.

Figure 4:
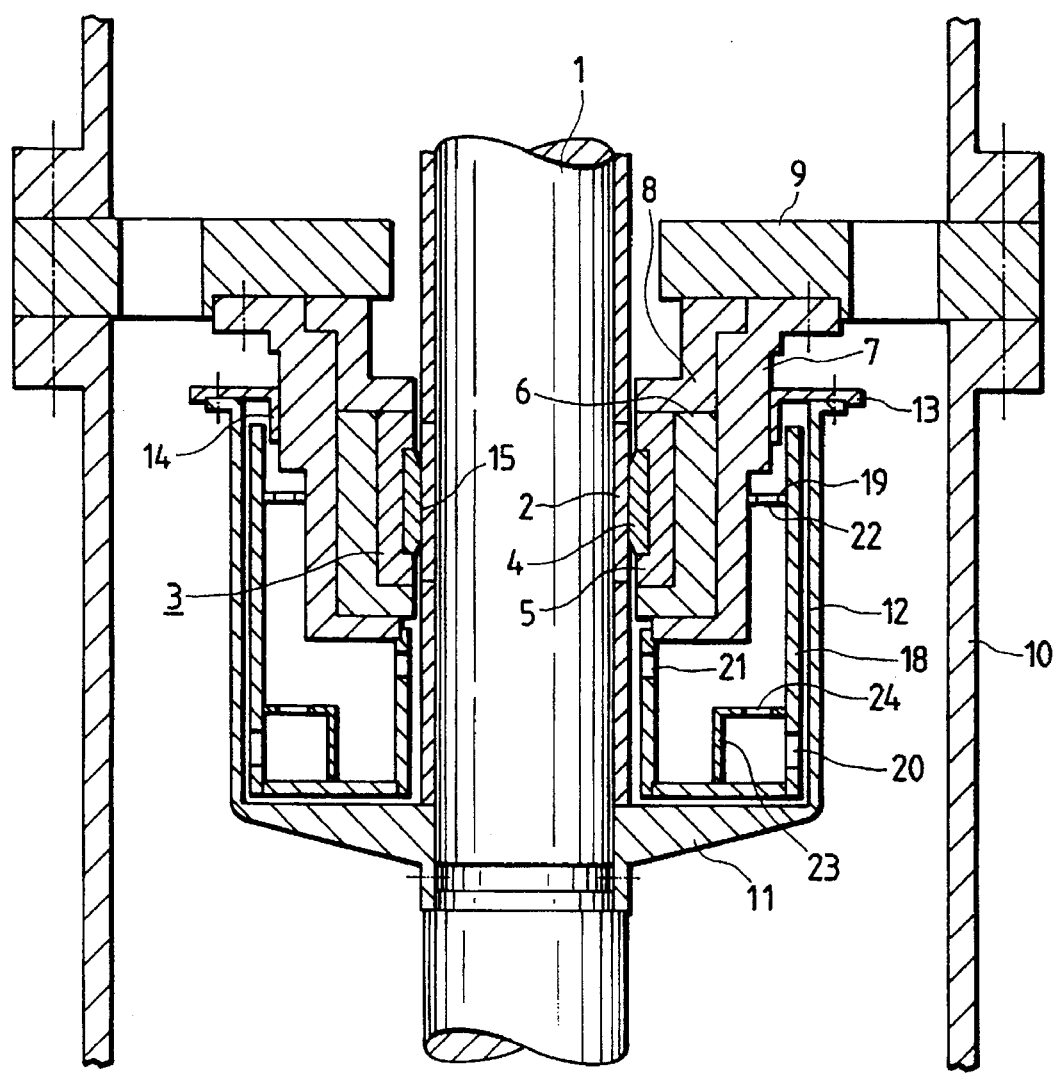
FIG. 4 is a vertical cross-sectional view showing a fourth embodiment of a ceramic bearing device in accordance with the present invention.

A fourth embodiment according to the present invention will be described below, referring to FIG. 4. FIG. 4 is a cross-sectional view showing the fourth embodiment according to the present invention.

In this embodiment, a water flow changing plate 23 is attached inside the cylindrical container 18 in the bearing construction of the third embodiment so as to cover the passage 20. further, the water flow changing plate 23 has a plurality of through hole 24 bored in the direction perpendicular to the passage 20.

In such a construction, only the pumped water in the portion covered with the water flow changing plate 23 is slowly rotated and the remainder of the pumped water inside the cylindrical container 18 is hardly rotated. Therefore, the static pressure of the pumped water inside the cylindrical container 18 is kept nearly constant. That is, the pump can be rotated at a higher speed since the decrease in the water level in the bearing sliding surface is lessened comparing to in the case without the water flow changing plate Although the water flow changing plate 23 is attached only in the inner side of the passage 20 having a higher circumferential speed in this embodiment, the similar effect can be also attained by attaching the water flow changing plate to the outer side of the passage 21 of the inner cylinder. Further, although the communicating hole 24 is provided in the upper surface of the water flow changing plate 23 in this embodiment, it may be provided also in the lower surface of the water flow changing plate. The size and the number of the communicating hole 24 is not specially limited.

Figure 5:
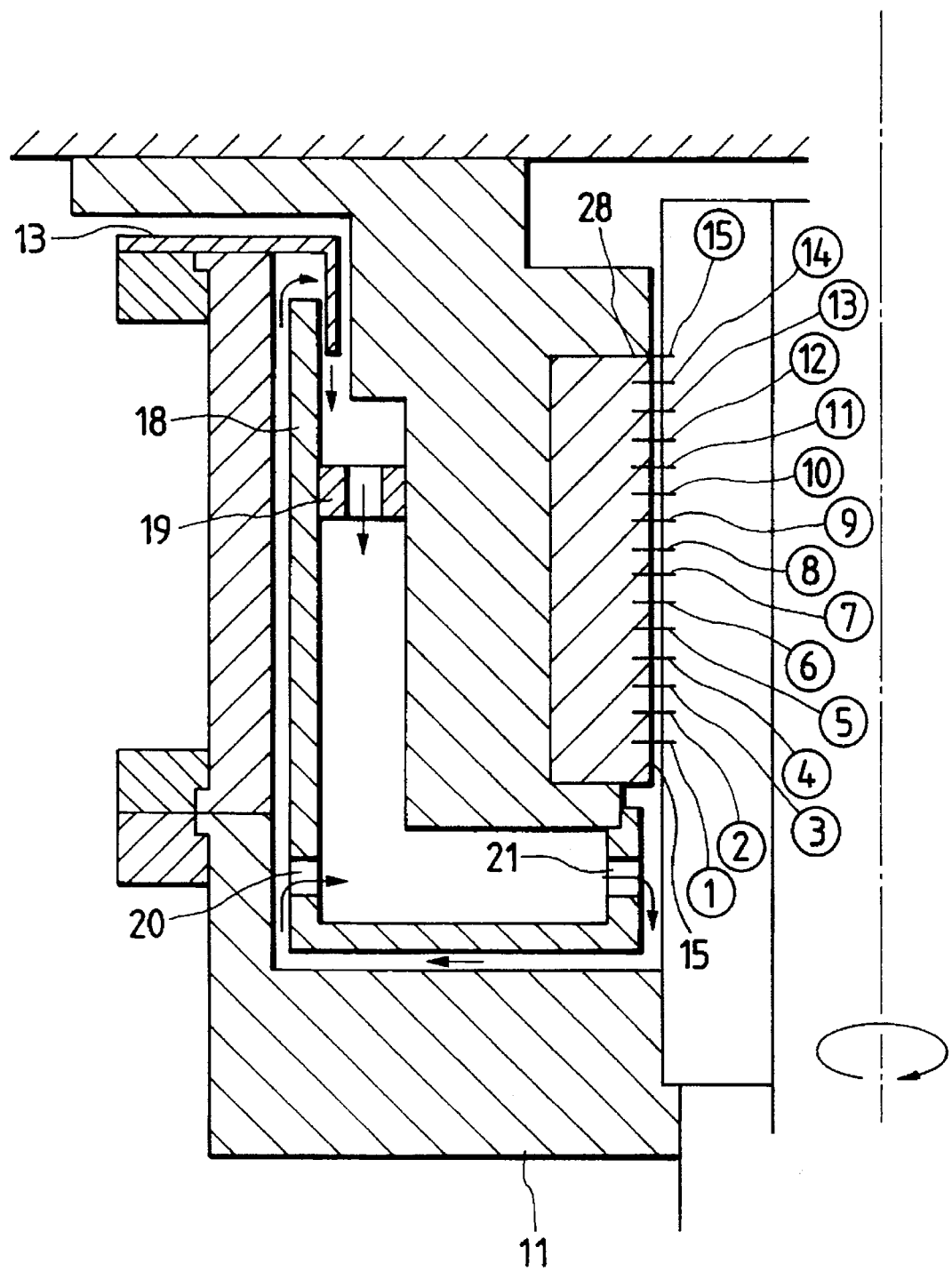
FIG. 5 is a view explaining a water level measuring test for a bearing sliding surface of a fifth embodiment in accordance with the present invention.

A fifth embodiment according to the present invention will be described below, referring to FIG. 5. FIG. 5 is a view explaining a water level measuring test for a bearing sliding surface 15 of a fifth embodiment in accordance with the present invention. The encircled numbers in the figure indicate levels in the bearing sliding surface 15. and the position (8) is the middle level position of the bearing sliding surface 15. A series of tests have been performed with rotating speed of the pump as a parameter and the test duration of 30 minutes for each rotating speed. A capacitance type water level gage is used for the water level gage 28. The test result is shown in Table 1.

TABLE 1

| | WATER LEVEL IN BEARING SLIDING SURFACE ((9)–(15)) | | | | | | |
|---|---|---|---|---|---|---|---|
| TIME | ROTATING SPEED (rpm) | | | | | | |
| (min) | 200 | 300 | 400 | 500 | 600 | 700 | 800 |
| 5 | (14) | (13) | (12) | (11) | (10) | (9) | (9) |
| 10 | " | " | " | " | (11) | " | " |
| 15 | " | " | " | " | " | " | " |
| 20 | " | " | " | " | " | " | " |
| 25 | " | " | " | " | " | " | " |
| 30 | " | " | " | " | " | " | " |
| AFTER STOP | (15) | (15) | (15) | (14) | (13) | (13) | (13) |

Although the water level decreases as the rotating speed of the pump increases, the water level is kept above the level (9) for the maximum rotating speed of 800 rpm. It is confirmed that a stable sliding characteristic can be attained. The each water level after stopping rotation of the pump has been the same level before starting rotation which is not shown in the table, and it is confirmed that the pumped water is not splashed out of the water storage tank 11.

Figure 6A:
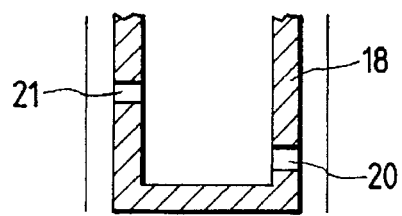
FIG. 6 is a graph showing the static pressure distribution of the pumped water inside a sixth embodiment of a cylindrical container in accordance with the present invention.
Figure 6B:
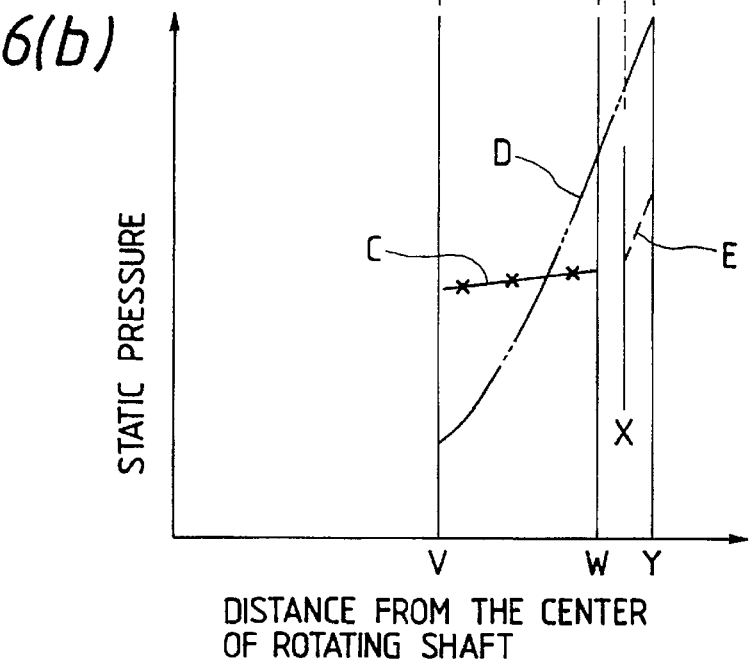

A sixth embodiment according to the present invention will be described below, referring to FIG. 6. FIG. 6 is a graph showing the static pressure distribution of the pumped water inside the sixth embodiment of a cylindrical container in accordance with the present invention. That is, the embodiment is a case where the static pressure distribution of the pumped water inside cylindrical container is measured during the test for the fifth embodiment described above.

The reference characters X, W, V and Y in FIG. 6 indicate the outer surface of the outer cylinder in the cylindrical container, the inner surface of the outer cylinder in the cylindrical container, the inner surface of the inner cylinder in the cylindrical container and the inner surface of the cylinder in the water storage tank, respectively. The line C indicates the static pressure distribution when the cylindrical container is installed, and the line D indicates the static pressure distribution when the cylindrical container is not installed. The line E indicates the static pressure distribution in the gap between the outer surface of the outer cylinder in the cylindrical container and the inner surface of the cylinder in the water storage tank when the cylindrical container is installed. The mark x indicates the point of measurement.

It is clear from FIG. 6 that the static pressure when the cylindrical container is installed has a even distribution and is extremely stable comparing to the case where the cylindrical container is not installed.

In other words, in the case of this embodiment, the pumped water inside the cylindrical container is hardly rotated and the pumped water surface is kept nearly horizontal from the inner surface of the inner cylinder in the cylindrical container to the inner surface of the outer cylinder in the cylindrical container.

Figures 7A, 7B:
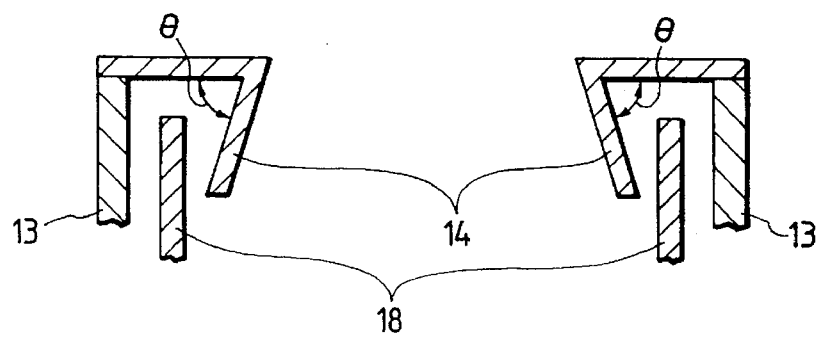
FIG. 7 is a vertical cross-sectional view showing a seventh embodiment of a return plate in accordance with the present invention.

A seventh embodiment according to the present invention will be described below, referring to FIG. 7. FIG. 7 is a vertical cross-sectional view of a return plate, and FIG. 7 (a) and (b) are positioned symmetrically right to left. The angle between a returning inner plate 14 and the horizontal top plate in the return plate 13 is set smaller than 90 degrees to certainly return the pumped water into the cylindrical container 18 without being splashed. In the case where the angle θ is smaller than 90 degrees as described above, the pumped water attached to the return plate 13 is certainly returned into the cylindrical container 18 since the pumped water flows downward with the action of the returning inner plate 14. On the other hand, in the case where the angle θ is larger than 90 degrees, the pumped water attached to the return plate 13 is splashed outside since the pumped water flows upward due to the action of centrifugal force.

Figure 8:
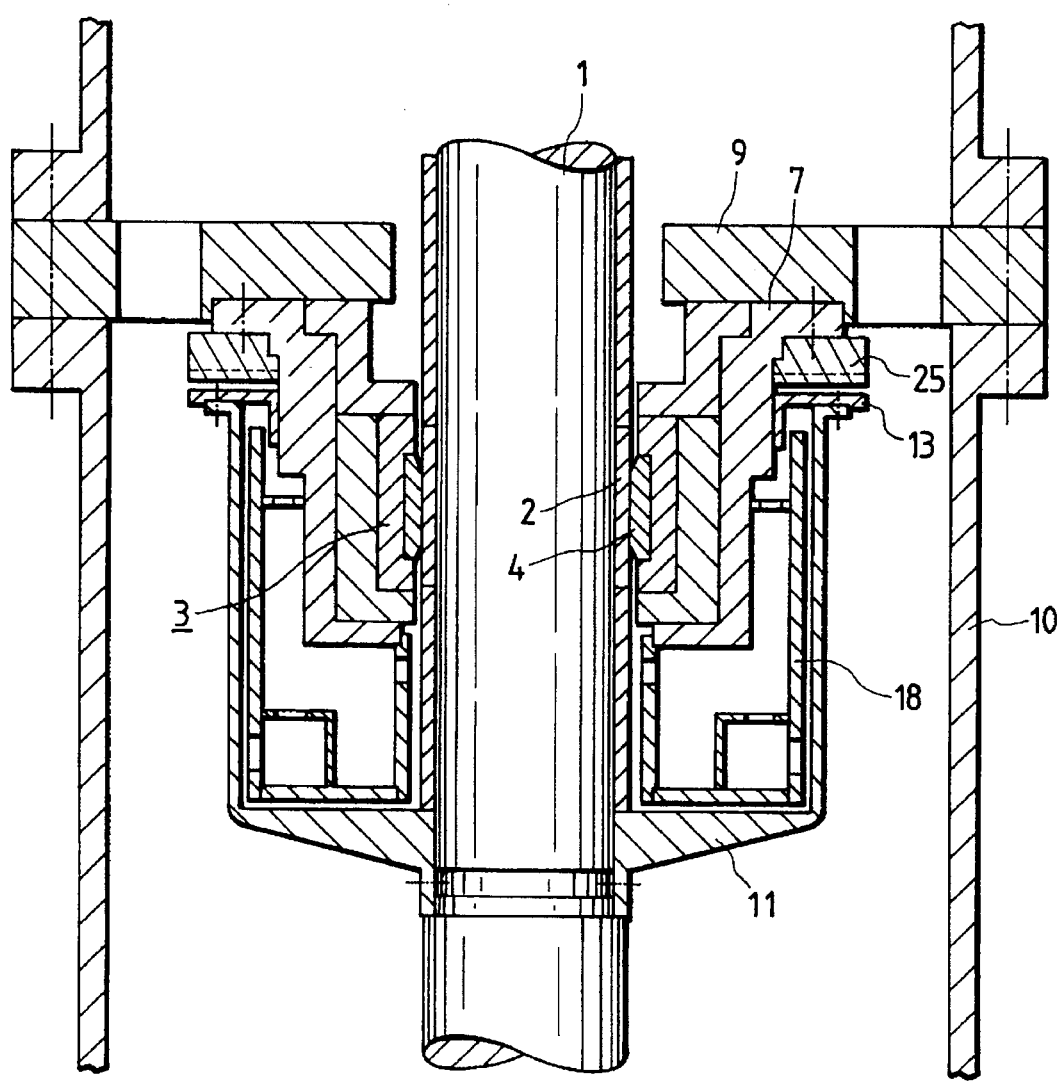
FIG. 8 is a vertical cross-sectional view showing an eighth embodiment of a ceramic bearing device in accordance with the present invention.

An eighth embodiment according to the present invention will be described below, referring to FIG. 8. FIG. 8 is a vertical cross-sectional view showing then eighth embodiment of a ceramic bearing device in accordance with the present invention. The construction of this embodiment is nearly the same as that of the fourth embodiment, the different point is that a seal 25 is provided between the return plate and the bearing casing in this embodiment.

With such a construction, foreign objects contained in the pumped water entered in the upper surface of the return plate 13 are splashed outward with the action of centrifugal force to prevent the foreign objects from entering into the water storage tank 11.

Figure 9:
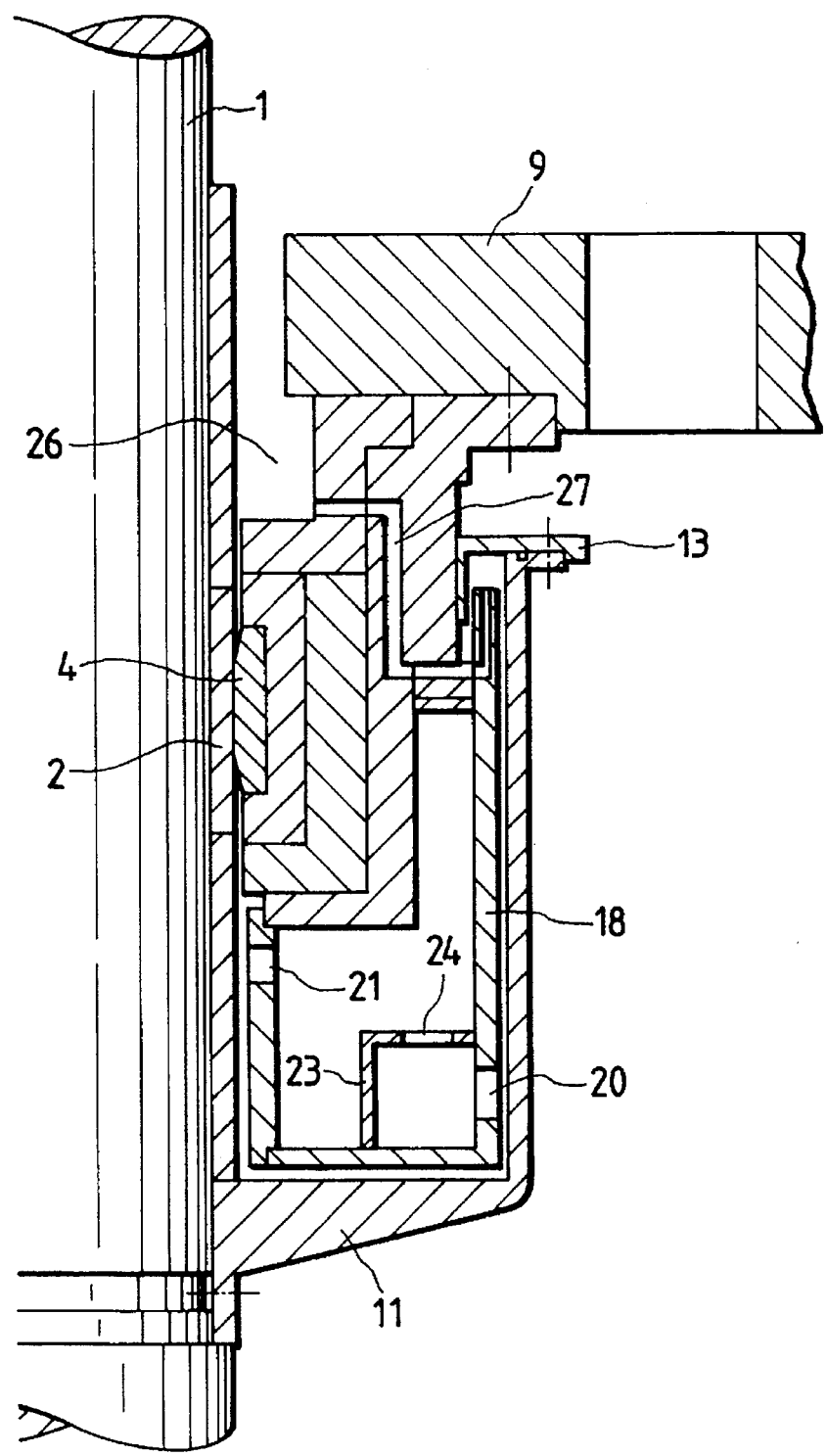
FIG. 9 is a vertical cross-sectional view showing a ninth embodiment of a ceramic bearing device in accordance with the present invention.

A ninth embodiment according to the present invention will be described below, referring to FIG. 9. FIG. 9 is a vertical cross-sectional view showing the ninth embodiment of a ceramic bearing device in accordance with the present invention. In this embodiment, there are provided a plurality of through holes 27 which communicate the top end portion of the cylindrical container 18 and a space 26 in the upper portion of the bearing above the ceramic bearing 4.

In this embodiment, the pumped water can be led to the space 26 in the upper portion of the bearing through the through holes 27. Therefore, the load capacity of the bearing is improved comparing to the case without the through holes 27 since a water film can be stably formed on the bearing sliding surface.

Figure 10:
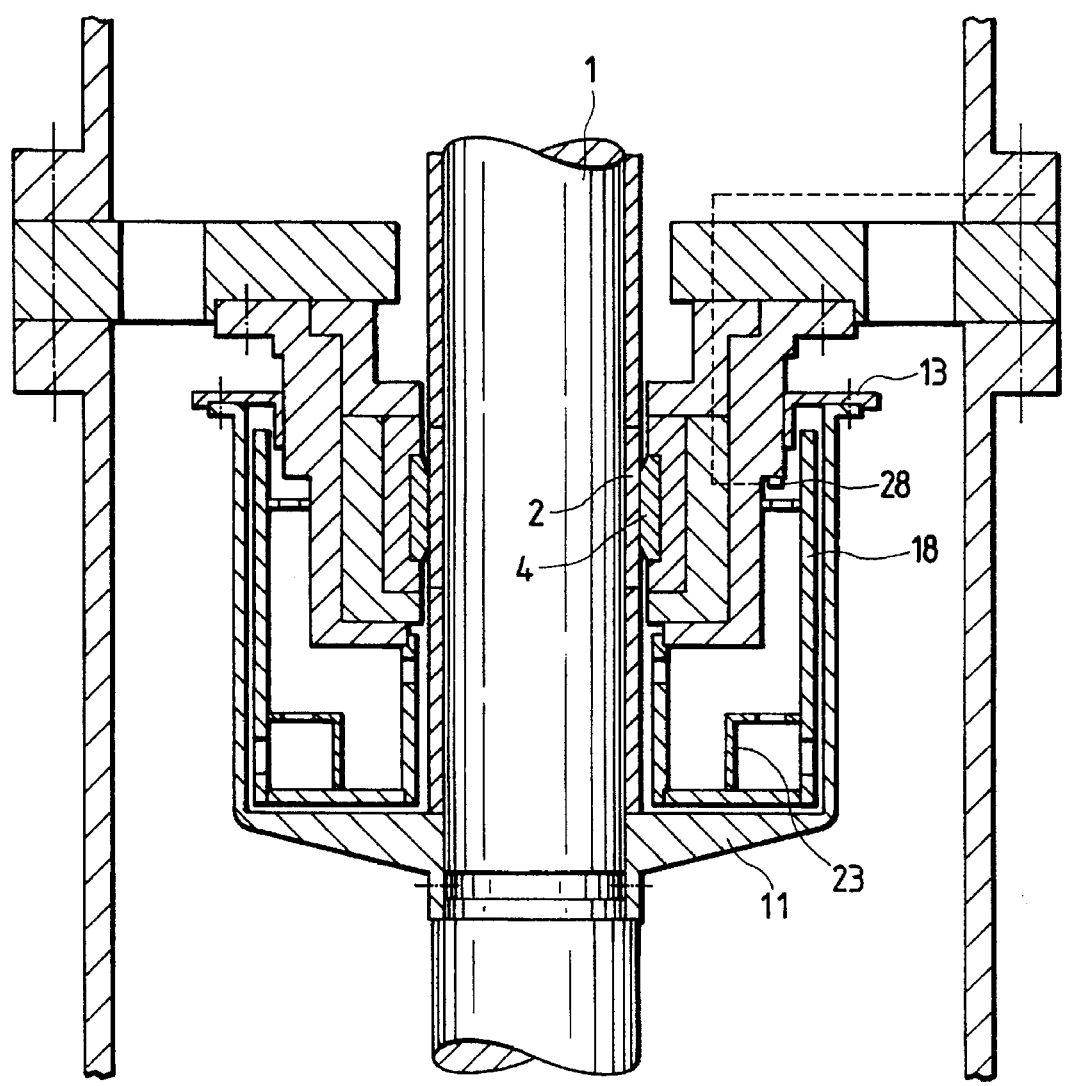
FIG. 10 is a vertical cross-sectional view showing a tenth embodiment of a ceramic bearing device in accordance with the present invention.

A tenth embodiment according to the present invention will be described below, referring to FIG. 10. FIG. 10 is a vertical cross-sectional view showing the embodiment of a ceramic bearing device in accordance with the present invention. The construction of this embodiment is nearly the same as that of the eighth embodiment. The different point is that a water level sensor 28 for detecting water level to confirm presence or absence of the pumped water inside the water storage tank 11 is provided in this embodiment. In this embodiment, a capacitance type water level gauge is employed for the water level sensor. By detecting the water level, the reliability of the pump system is further improved.

As the water level sensor 28 other than the capacitance type, an optical type water level gauge, an electric type water level gauge and a pressure type water level gauge may be used.

Figure 11:
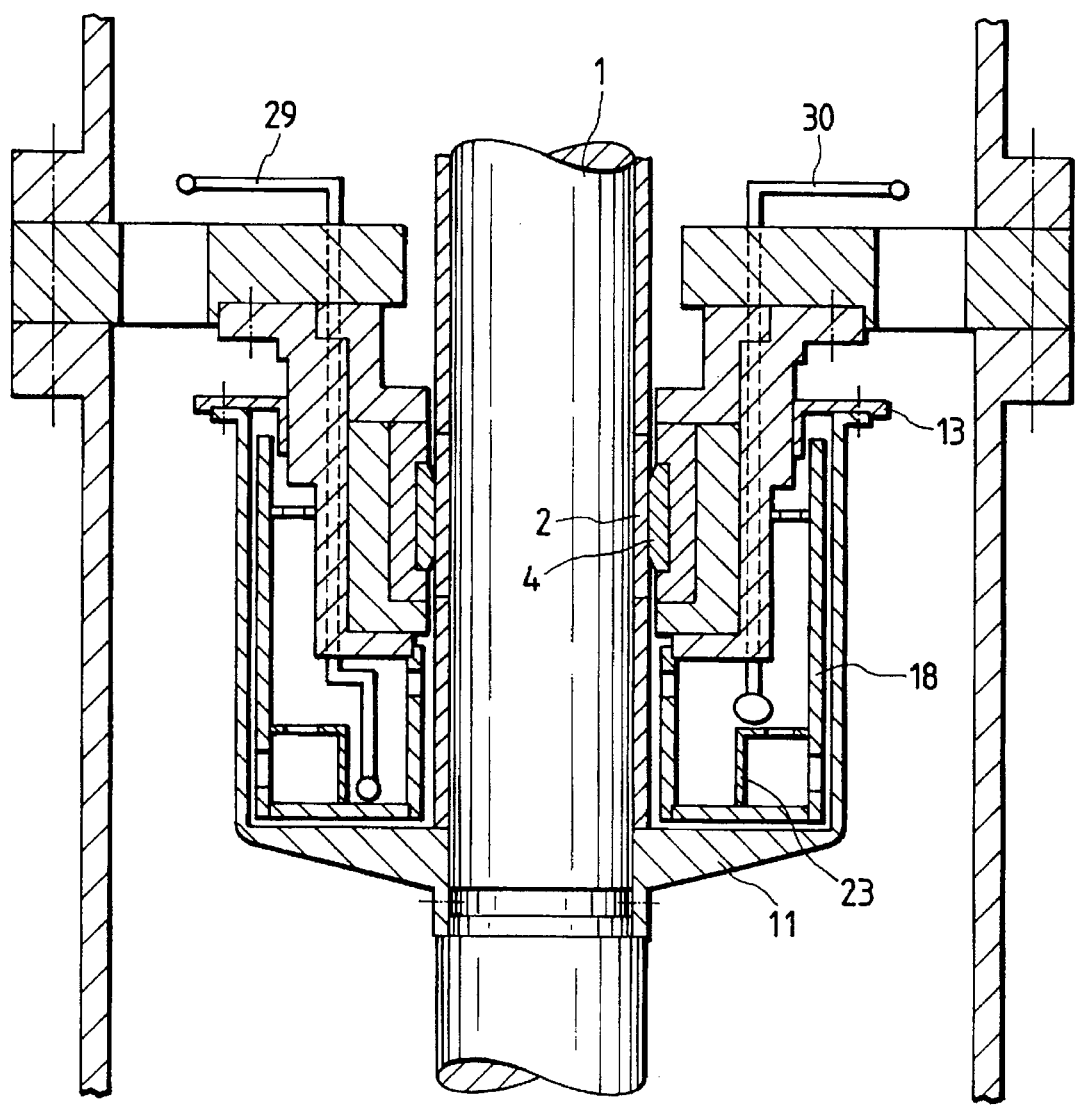
FIG. 11 is a vertical cross-sectional view showing an eleventh embodiment of a ceramic bearing device in accordance with the present invention.

An eleventh embodiment according to the present invention will be described below, referring to FIG. 11. FIG. 11 is a vertical cross-sectional view showing the embodiment of a ceramic bearing device. The construction of this embodiment is nearly the same as that of the eighth embodiment. The different point is that there are provided a sand discharging pipe 29 and a flushing water supply pipe 30 to discharge the soil and sand inside the cylindrical container 18.

The sand discharging pipe 29 is for discharging particles of soil and sand accumulated inside the cylindrical container 18, and the flushing water supply pipe 30 is for supply the flushing water into the cylindrical container 18. The sand discharging pipe 29 and the flushing water supply pipe 30 individually have ring-shaped piping portions having a plurality of holes.

The sand discharging pipe 29 is installed in a portion near the bottom surface of the cylindrical container 18, and the flushing water supply pipe 30 is installed above the water flow changing plate 23. While clean water is supplied from the flushing water supply pipe 30, the particles of sand and soil accumulated on the surface of the water flow changing plate 23 are washed down to the bottom surface of the cylindrical container 18 and the particles of sand and soil are discharged through the sand discharging pipe connected to a discharging pump. With the construction, the particles of sand and soil can be discharged in accordance with schedule, and, consequently, the particles of san and soil can be discharged without disassembling the ceramic bearing device 3.

Figure 12:
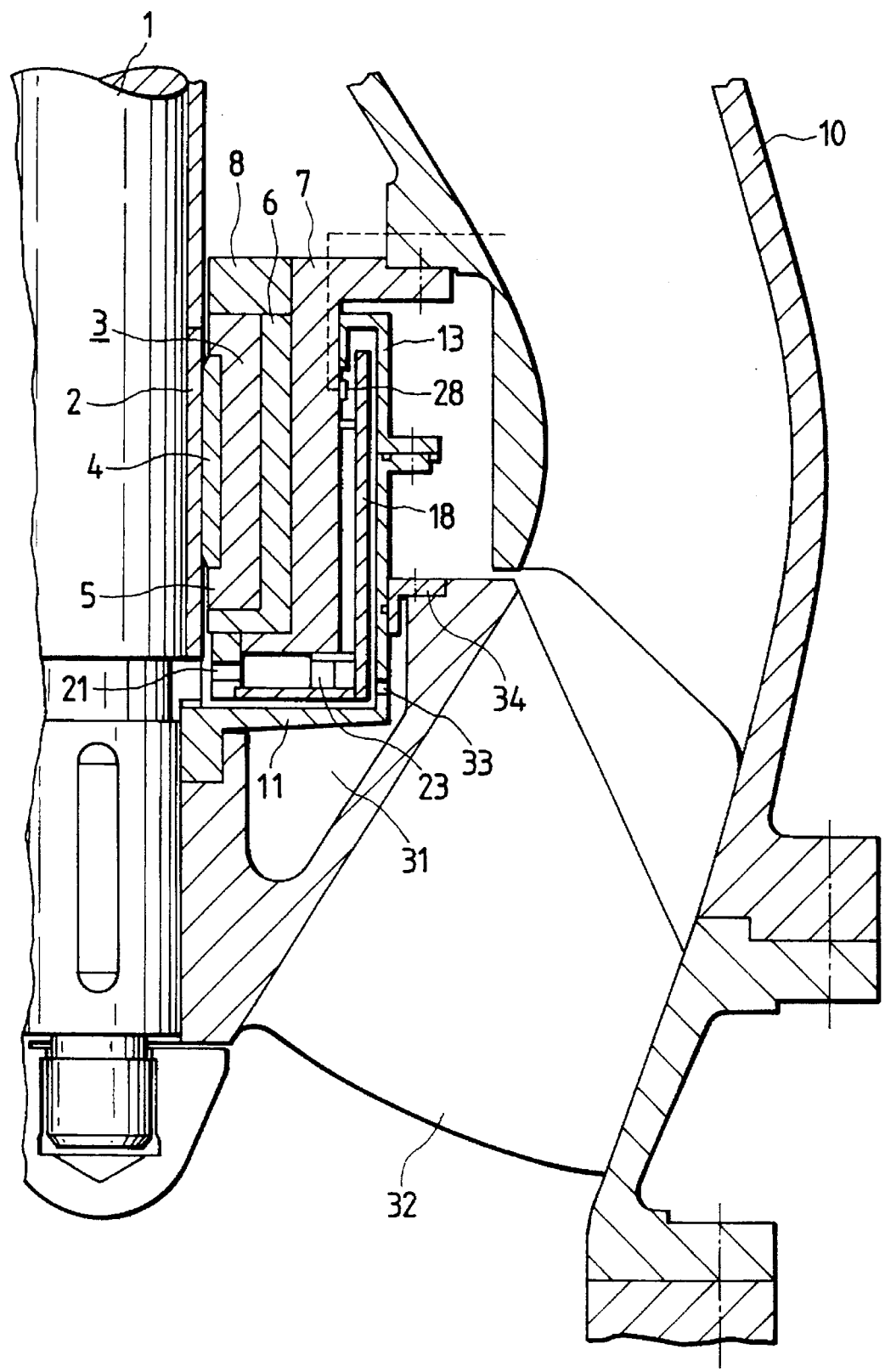
FIG. 12 is a vertical cross-sectional view showing a twelfth embodiment of a drainage pump in accordance with the present invention.
Figure 13:
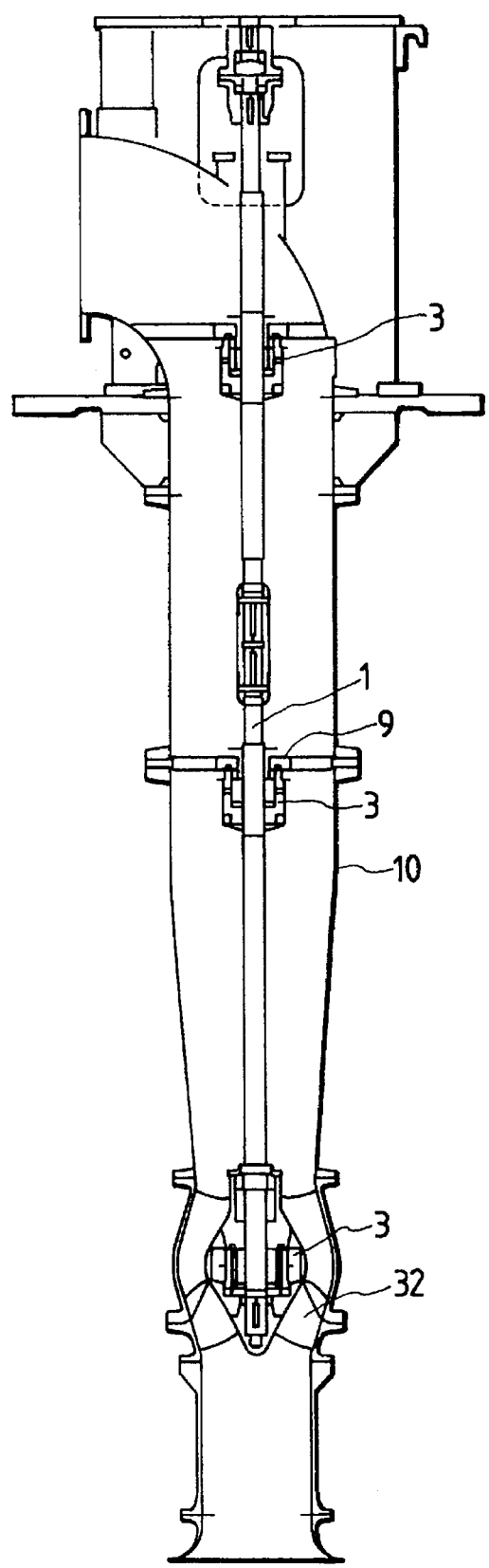
FIG. 13 is a vertical cross-sectional view showing a conventional ceramic bearing device for a vertical shaft pump used for drainage of rain water.

A twelfth embodiment according to the present invention will be described below, referring to FIG. 12. FIG. 12 is a vertical cross-sectional view of a drainage pump having an embodiment of a ceramic bearing device, and shows the outline of the construction of the drainage pump having the ceramic bearing device in accordance with the present invention.

The drainage pump has a pump casing 10, a ceramic bearing device 3 attached to the pump casing 10 and an impeller 32 fixed to a pump main shaft 1, and the impeller 32 is supported with the ceramic bearing device 3 in an overhanging state. The ceramic bearing device 3 has nearly the same construction as that in the third embodiment described above.

A water storage tank 11 is installed in the upper space 31 of the impeller 32, and a ring plate 34 is provided in the outer peripheral portion of the water storage tank 11 and is fixed and sealed so that the pumped water stored in the upper space 31 may not leak outside.

A passage 33 communicating with the upper space 31 is provided in the outer peripheral portion of the water storage tank 11 so that the upper space 31 may have the same operation and effect as the water storage tank 11 has.

The particles of sand and soil are moved to the upper space 31 through the passage 33 provided in the outer periphery of the water storage tank 11 during rotating of the water storage tank 11. The particles of sand and soil are accumulated in the upper space 31 and the pumped water in the water storage tank 11 becomes clean water. Therefore, wear due to the particles of sand and soil can be decreased.

Thereby, a ceramic bearing device having a high reliability can be obtained. In a bearing device not having an oil retaining porous ceramic bearing nor a water storage tank, the ceramic bearing is apt to directly contact with the sleeve of the pump main shaft due to an impulsive load acting on the impeller at the beginning of pump starting since there is a small amount of oil or water on the bearing sliding surface. Therefore, there is a large possibility to cause a damage.

On the other hand, in the present invention, the ceramic bearing hardly contacts with the sleeve of the pump main shaft due to a reaction force generated by a squeezing action even if an impulsive load acts on the impeller at the beginning of pump starting since the bearing sliding surface is always immersed in the lubricating water and consequently there is a sufficient amount of water on the bearing sliding surface. It is possible to prevent occurrence of the damage in the bearing.

Since the return plate is attached in the upper portion of the water storage tank, the speed of the pumped water flowing into the water storage tank is moderated by the flow resistance of the return plate even if the pumped water rapidly flows into the drainage pump just after starting of pumping. Thereby, most of the foreign objects entering together with the pumped water are flow upward in the drainage pump and do not enter into the water storage tank. Therefore, the return plate has an effect to prevent the foreign objects from entering into the water storage tank.

Although the material used for the bearing in the embodiment according to the present invention is a ceramic, the same operation and the same effect may be obtained by using a material having a high hardness such as a sintered hard alloy for the bearing or by using a member coated with a material having a high hardness for the bearing sliding surface.

According to the present invention, the following effects can be attained regarding the bearing device for a pump.

(1) Since the bearing is lubricated with the pumped water stored in the water storage tank in advance without supplying lubricating water from an external water source, it is possible to obtain a more stable bearing sliding characteristic comparing to that obtained by a conventional bearing lubricating construction. Especially, no-load operation of the pump for over 30 minutes can be performed since the splash preventing means is provided so as to prevent the pumped water inside the water storage tank from splashing outside.

Further, the pumped water once stored in the water storage tank is kept stored for a long time since the pumped water flows into the water storage tank as the lubricating water automatically during pumping operation and is not vaporized because of a high humidity inside the drainage pump. Therefore, it is no need to supply the lubricating water from an external water source.

(2) In a pump system not having any oil retaining porous ceramic bearing or in a pump system of externally water supplying type not having any water storage tank, the ceramic bearing is apt to be directly contacted with the sleeve by the impulsive load acting on the impeller at the beginning of starting to pump and the bearing may be damaged since there is a small amount of oil or water on the bearing sliding surface. On the other hand, in the present invention, the bearing sliding surface is always immersed in water and there is sufficient water on the bearing sliding surface. Therefore, the ceramic bearing is not directly contacted with the sleeve even if the impulsive load acts on the impeller at the beginning of starting to pump, and occurrence of the damage in the bearing can be prevented.

(3) Since the return plate is attached in the upper portion of the water storage tank, the speed of the pumped water flowing into the water storage tank is moderated by the flow resistance of the return plate even if the pumped water rapidly flows into the drainage pump just after starting of pumping. Thereby, most of the foreign objects entering together with the pumped water are flow upward in the drainage pump and do not enter into the water storage tank.

(4) Since a ceramic bearing having a higher density structure can be used comparing to an oil retaining porous ceramic bearing, the reliability in mechanical strength is improved.

(5) Since the water supply piping system is not necessary, the maintenance management of the piping is not necessary, and, therefore, time and labor can be eliminated. Further, since the failure of the water supply piping system is eliminated, the reliability of the overall machine system can be improved.

What is claimed is:

1. A method of operating a pump having a bearing device which has a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, said water storage tank being fixed to said pump main shaft, means for preventing said pumped water from splashing outside said water storage tank, no-load operation of said pump being performed for longer than 30 minutes without supplying water from a water source outside said pump casing.

2. A method of operating a pump having a bearing device which has a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, a return plate being attached to the upper end portion of said water storage tank, a cylindrical container being provided inside said water tank, the cylindrical container being open in the upper portion, having a passage communicating between the inside portion and the outside portion and having a water flow changing plate in said inside portion so as to cover said passage, said cylindrical container being composed of an inner cylinder and an outer cylinder, and a horizontal bottom plate the end portions of which are secured to the both bottom end portions of said inner cylinder and said outer cylinder, said inner cylinder being positioned in the outer peripheral side of said pump main shaft, said horizontal bottom plate being positioned in the lower side of the bottom surface of said bearing casing, said outer cylinder being positioned in the outer peripheral side of said bearing casing, said cylindrical container being fixed to said bearing casing so as to surround the bottom surface and the outer peripheral side said bearing casing, said water storage tank being fixed to said pump main shaft so as to surround said cylindrical container, no-load operation of said pump being performed for longer than 30 minutes without supplying water from a water source outside said pump casing.

3. A bearing device for a pump including a bearing slidably supporting a pump main shaft provided inside a pump casing, a bearing case mounting said bearing and a bearing casing elastically supporting said bearing case, wherein: a water storage tank for storing pumped water is provided to surround the outer periphery of said bearing casing, said water storage tank being fixed to said pump main shaft, means for preventing said pumped water from splashing outside said water storage tank.

4. A bearing device for a pump having a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, said water storage tank being fixed to said pump main shaft, a return plate being attached to the upper end portion of said water storage tank.

5. A bearing device for a pump according to claim 4, wherein said return plate is composed of a cylindrical inner plate and a cylindrical outer plate and a horizontal top plate the end portions of which are secured to the both top end portions of said inner plate and said outer plate, the angle between said inner plate and said horizontal top plate being smaller than 90 degree.

6. A bearing device for a pump according to claim 4, wherein sealing capability for preventing foreign objects from entering is added to the upper surface of said return plate.

7. A bearing device for a pump according to claim 4, which comprises means for confirming presence or absence of said pumped water.

8. A bearing device for a pump according to claim 7, wherein said means for confirming presence or absence of said pumped water employs a capacitance type water level gauge.

9. A bearing device for a pump according to claim 7, wherein said means for confirming presence or absence of said pumped water employs an optical type water level gauge.

10. A bearing device for a pump according to claim 7, wherein said means for confirming presence or absence of said pumped water employs an electric type water level gauge.

11. A bearing device for a pump according to claim 1, wherein said means for confirming presence or absence of said pumped water employs a pressure type water level gauge.

12. A bearing device for a pump having a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, a return plate being attached to the upper end portion of said water storage tank, a small cylindrical container opening the upper portion placed inside said water storage tank being fixed to the outer peripheral portion of said bearing casing, a passage communicating between said small cylindrical container and the bearing sliding surface or a gap formed above said bearing sliding surface being provided, said water storage tank being fixed to said pump main shaft so as to surround said small cylindrical container.

13. A bearing device for a pump according to claim 12, wherein said passage provided in the small cylindrical container is composed of a plurality of holes directing in the radial direction arranged on an identical circumference in a given spacing.

14. A bearing device for a pump according to claim 12, wherein said return plate attached to the upper end portion of the water storage tank is constructed so as to surround the upper end portion in the outer peripheral side of said small cylindrical container to prevent the pumped water inside said water storage tank from splashing outside said small cylindrical container.

15. A bearing device for a pump according to claim 12, wherein a plurality of holes communicating between said cylindrical container and a plenum provided in the upper portion of said bearing are provided.

16. A bearing device for a pump according to claim 12, which comprises a water supply and drainage means for discharging particles of soil and sand inside said small cylindrical container.

17. A bearing device for a pump having a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, a return plate being attached to the upper end portion of said water storage tank, a cylindrical container opening in the upper portion and having a passage communicating between the inside portion and the outside portion being provided inside said water tank, said cylindrical container being composed of an inner cylinder and an outer cylinder, and a horizontal bottom plate the end portions of which are secured to the both bottom end portions of said inner cylinder and said outer cylinder, said inner cylinder being positioned in the outer peripheral side of said pump main shaft, said horizontal bottom plate being positioned in the lower side of the bottom surface of said bearing casing, said outer cylinder being positioned in the outer peripheral side of said bearing casing, said cylindrical container being fixed to said bearing casing so as to surround the bottom surface and the outer peripheral side said bearing casing, said water storage tank being fixed to said pump main shaft so as to surround said cylindrical container.

18. A bearing device for a pump according to claim 17, wherein said passage provided in the cylindrical container is composed of a plurality of holes directing in the radial direction arranged on an identical circumference in a given spacing.

19. A bearing device for a pump according to claim 17, wherein said return plate attached to the upper end portion of the water storage tank is constructed so as to surround the upper end portion in the outer peripheral side of said cylindrical container to prevent the pump water inside said water storage tank from splashing outside said cylindrical container.

20. A bearing device for a pump according to claim 17, which comprises a water supply and drainage means for discharging particles of soil and sand inside said cylindrical container.

21. A bearing device for a pump having a bearing slidably supporting a pump main shaft provided inside a pump casing, a bearing case mounting said bearing and a bearing casing elastically supporting said bearing case, wherein:

a water storage tank for storing pumped water is provided so as to surround the outer periphery of said bearing casing, a return plate being attached to the upper end portion of said water storage tank, a cylindrical container being provided inside said water tank, the cylindrical container being open in the upper portion, having a passage communicating between the inside portion and the outside portion and having a water flow changing plate in said inside portion in covering said passage, said cylindrical container being composed of an inner cylinder and an outer cylinder, and a horizontal bottom plate the end portions of which are secured to the both bottom end portions of said inner cylinder and said outer cylinder, said inner cylinder being positioned in the outer peripheral side of said pump main shaft, said horizontal bottom plate being positioned in the lower side of the bottom surface of said bearing casing, said outer cylinder being positioned in the outer peripheral side of said bearing casing, said cylindrical container being fixed to said bearing casing so as to surround the bottom surface and the outer peripheral side said bearing casing, said water storage tank being fixed to said pump main shaft so as to surround said cylindrical container.

22. A bearing device for a pump according to claim 21, wherein said water flow changing plate is attached to the outer peripheral side of inner portion of said cylindrical container so as to cover the passage communicating the inner portion and the outer portion of said cylindrical container.

23. A bearing device for a pump according to claim 21, wherein said water flow changing plate has a plurality of holes in the direction perpendicular to the direction of the passage provided in said cylindrical container.

* * * * *

UNITED STATES PATENT AND TRADEMARK OFFICE
CERTIFICATE OF CORRECTION

PATENT NO. : 5,639,165
DATED : June 17, 1997
INVENTOR(S) : Kohji Aizawa, et. al.

It is certified that error appears in the above-identified patent and that said Letters Patent is hereby corrected as shown below:

| Column | Line | |
|--------|------|---|
| 9 | 46 | After "plate" insert --23.--. |
| 15 | 19 | Change "claim 1." to --claim 7,--. |

Signed and Sealed this

Tenth Day of February, 1998

Attest:

BRUCE LEHMAN

Attesting Officer

Commissioner of Patents and Trademarks